March 23, 1948.   P. W. DOBLIN ET AL   2,438,361
BELT SPLICING DEVICE
Filed Jan. 3, 1946   3 Sheets-Sheet 1

INVENTORS
PERCY W. DOBLIN
BY HANDEL ASHWORTH
Van Deventer + Grier
ATTORNEYS

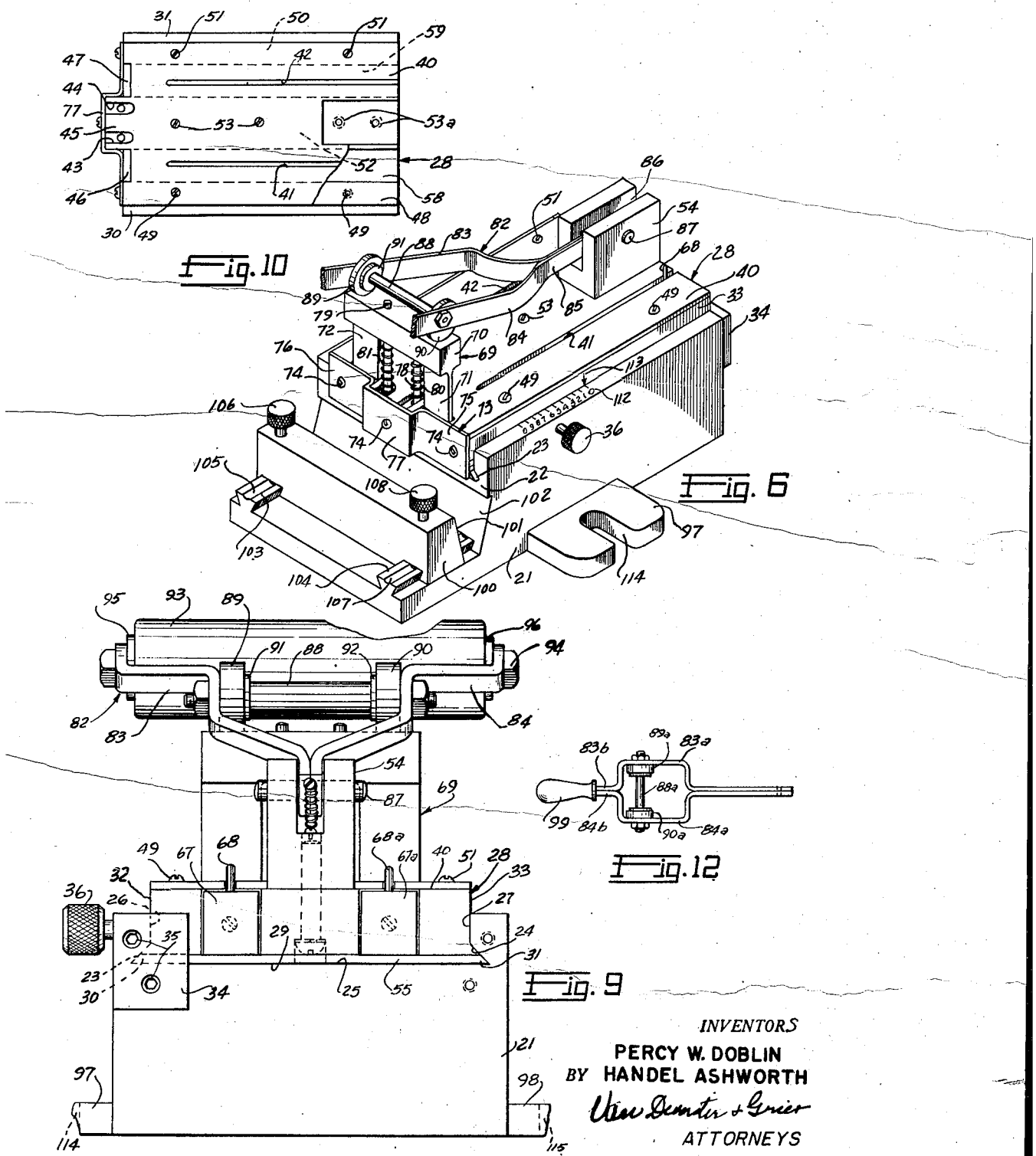

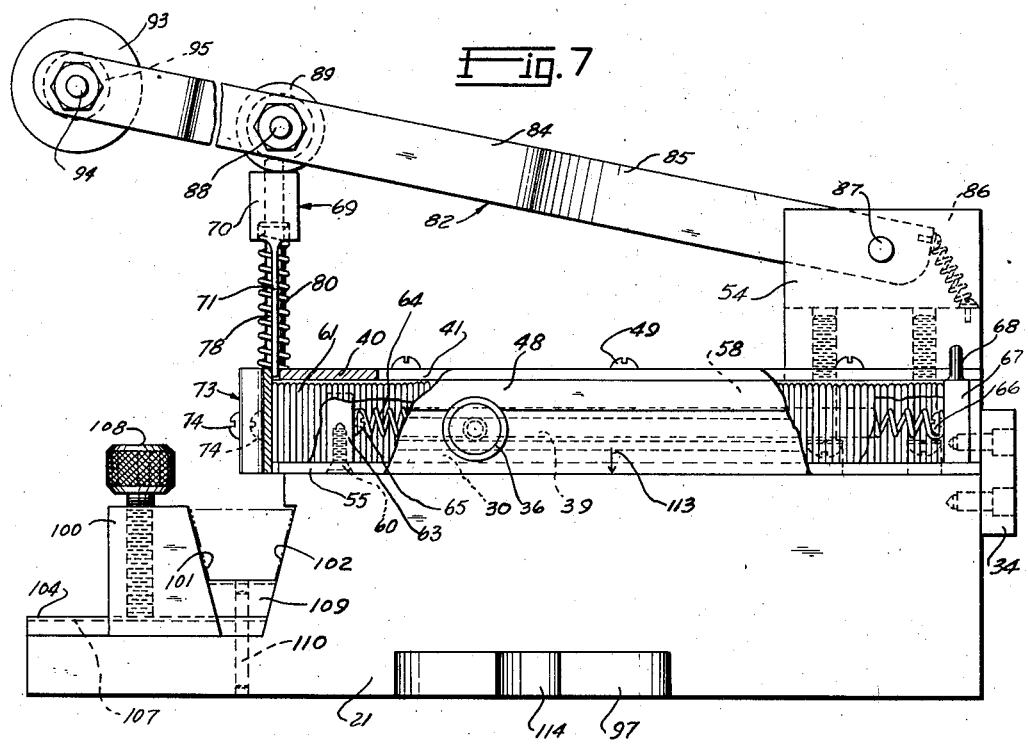
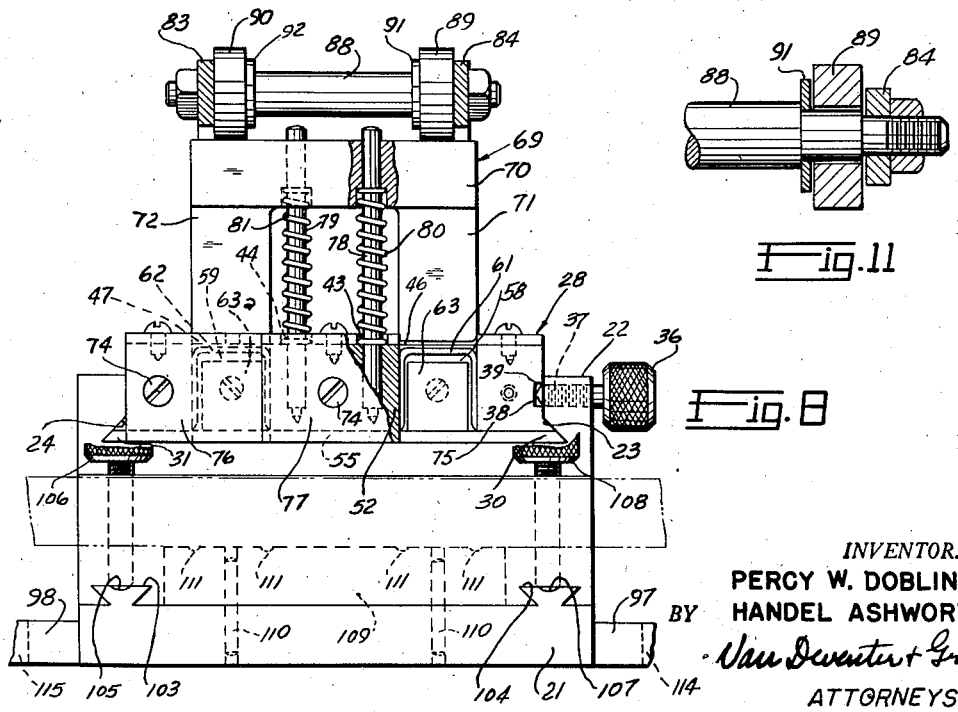

Patented Mar. 23, 1948

2,438,361

UNITED STATES PATENT OFFICE 2,438,361

BELT SPLICING DEVICE

Percy W. Doblin, Brooklyn, and Handel Ashworth, Baldwin, N. Y.

Application January 3, 1946, Serial No. 638,870

9 Claims. (Cl. 1—3)

1

This invention relates to improvements in belt splicing devices and is directed more particularly to devices for splicing V belts.

An object of the invention is the provision, in belt splicing apparatus, of means for accurately cutting the ends of a belt to be spliced, so that said cut ends will match both angularly and laterally.

A further object of the invention is the provision of apparatus for holding the cut ends of the belt in matched relation and stitching through the matched ends while they are so held.

Yet another object of the invention is the provision of means for cutting the ends of a V belt to provide surfaces matching and abutting one another along a plane angular with respect to the longitudinal plane of the belt, clamping the ends of the belt in said matching relation, and securing said ends together by means of metallic staples or the like passing therethrough and having their pointed ends clinched.

Heretofore in this art it has been customary to form V belts in endless units and as a result, in certain types of machines it was necessary to at least partially tear down a machine to get a belt on it. For example, on a lathe, it was necessary to take the live spindle out in order to get the belt over the shaft and onto the cone pulleys. Also large numbers of different sizes of endless V belts had to be on hand in order to take care of different center to center distances between the shafts carrying pulleys which were to be engaged by the V belts.

By our invention we are enabled to cut and form (by splicing the cut ends together) V belts for use in any situation and due to the fact that the belts are cut and spliced it is no longer necessary to dismantle or partially dismantle the device on which the belt is to be used. The ends of the belt to be joined are accurately cut along acute angles and the cut surfaces are matched, clamped in matched relation, and permanently secured together while being so clamped. In some instances we may, in addition to using the metallic stitching elements, apply an adhesive to the matched surfaces to additionally reinforce the joint.

In order to illustrate the invention, one embodiment is shown in the accompanying drawings in which:

Figure 3 is a fragmentary view showing the

Figure 3:
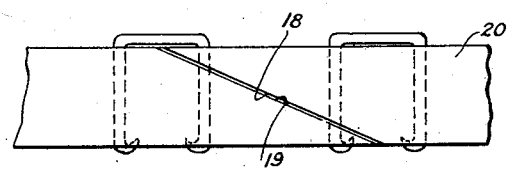
Figure 5:
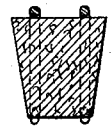
Figure 4:
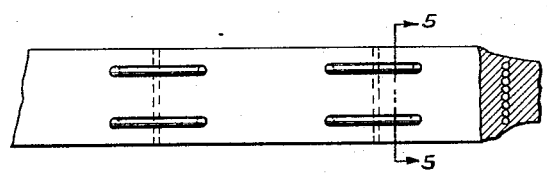

2 ends of a V belt secured together according to the invention;

Figure 4 is a plan view of the arrangements shown in Figure 3;

Figure 5 is a sectional elevation taken along the lines 5—5 of Figure 4;

Figure 6 is a perspective view of the device for clamping the cut ends of the V belt in proper relation and matching relation and for stitching the same together while so held;

Figure 7 is a side elevation of the device shown in Figure 6 with portions broken away to show the structure;

Figure 8 is a front elevation of the device shown in Figure 6;

Figure 9 is a rear elevation of the device;

Figure 10 is a plan view of the slidable carriage with the operating lever and stitching means removed;

Figure 11 is a fragmentary view showing the method of mounting rollers for engaging the stitching plunger; and Figure 12 is a view showing a modified form of the operating lever.

Figure 1:
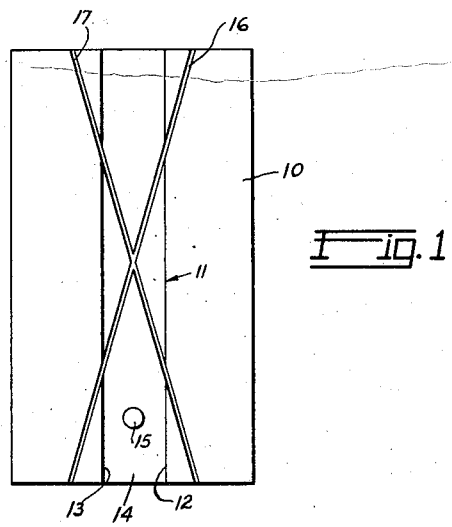
Figure 1 is a plan view of a cutting guide for cutting the ends of the V belts angularly.
Figure 2:
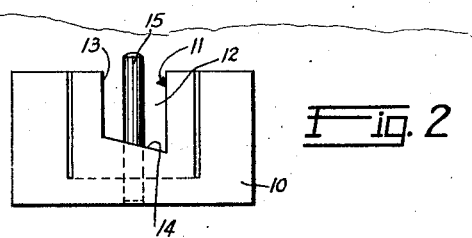
Figure 2 is an end elevation of the cutting guide shown in Figure 1.

Referring first to Figures 1 and 2, which illustrate a cutting guide for cutting the ends of the V belts to form the splice, a body 10 which may be in a form of a rectangular block has a longitudinal slot 11 formed therein. Opposite sides 12 and 13 of the slot are parallel and perfectly vertical. The bottom 14 of the slot is angular so that when a V belt to be cut is positioned therein, the angular face which normally engages the shive, or angular faces of the belt groove in the pulley, lies on the surface 14 and the normal inner and outer surface of the belt respectively engage the sides 13 and 12. Within and adjacent to one end of the slot 11 is a vertical pin 15 which functions as a stop pin.

Angular with respect to the axis of the slot 11 is a groove 16 which crosses the slot intermediate the ends thereof. A second angular groove 17 is formed in the block 10 and this groove crosses the groove 16 in the neighborhood of the middle of the groove 11.

Now, in order to use the cutting guide, one end of the V belt is positioned in the slot 11 with its end against the pin 15 and with a knife, saw or other cutting device, positioned in the groove 16, the end is severed, leaving an angular surface such as the surface 18 shown in Figure 3, then the other end of the belt is positioned in the slot 11, having its end against the stop pin 15 and the belt is cut by placing the cutting device in the groove 17, thereby forming an angular surface such as that shown at 19 in Figure 3.

After the belt, designated by the numeral 20, has been cut in the manner described above, it is then placed in our new and improved splicing device and clamped therein in the relation shown in Figure 3, following which the angular or beveled ends are secured together in a manner to be presently described.

Referring now to Figures 6 to 10 inclusive, the splicing or stitching device has a base 21, a portion 22 of which has a dovetail 23 formed thereon on one side thereof, and which has a dovetail 24 formed on the opposite side thereof. The portion 22 has a central slot 25 formed therein having vertical side portions 26 and 27. Mounted in the slot 25 is a slidable carriage generally designated by the numeral 28, a plan view of which is shown in Figure 10.

The carriage 28 has a bottom surface 29 which slides on the bottom surface of slot 25. The carriage also has a beveled portion 30 along one edge thereof and a second beveled portion 31 along the opposite edge thereof, each respectively cooperating with the dovetails 23 and 24. The carriage also has vertical side portions 32 and 33, which respectively form sliding fits with the vertical portions 26 and 27 of the slot 25, respectively. A plate 34 (Figure 9) is secured to the base 21 by means of screws 35 and is provided to limit the rearward motion of the carriage 28.

A thumbscrew 36 has a portion 37 threaded into the base 21 and adapted to engage and clamp the carriage in any desired position on said base. The point of the threaded portion 37 engages a depressed surface 38 which constitutes the bottom of a longitudinal slot 39 formed along the right side of the carriage 28, as seen in Figure 8. The reason for providing a depressed surface is that in case the surface is scarred by the end of the thumbscrew, the scars do not interfere with the slidability of the carriage.

The carriage 28 is fabricated as follows: The upper plate 40 has spaced slots 41 and 42 formed therein. These slots are longitudinal and are equally spaced from the center line of the plate. The plate also has slots 43 and 44 formed in a tongue portion 45 at one end thereof. Adjacent the tongue portion are formed slots 46 and 47 through which the riveting plunger, to be presently described, operates. Adjacent to one edge of the plate 40 is a longitudinal member 48, one edge of which constitutes the beveled edge 30. The longitudinal member 48 is secured to the plate 40 by means of screws 49. Adjacent the opposite edge of plate 40 is a second longitudinal member 50, the outer edge of which constitutes the beveled edge 31 above referred to. This member is secured to the plate by means of screws 51. Intermediate the longitudinal members 48 and 50 is a third longitudinal member 52, which is secured to the plate 40 by means of screws 53. Screws from below via hole 53a engage tapped holes in a yoke member 54. A second plate 55 is parallel to the plate 40. The plate 55 underlies the longitudinal members 48, 50 and 52 and is secured to said members by means of flat head screws, not shown, but similar to the screw 60 shown in Figure 7.

Between the longitudinal member 48 and the member 52 is formed a longitudinal slot 58, and between the longitudinal member 50 and the longitudinal member 52 is formed a longitudinal slot 59. These longitudinal slots are provided to receive the rows of staples 61 and 62 respectively.

Within and adjacent to the left end of slot 58, as seen in Figure 7, is a post 63 which is secured to the bottom plate 55 by means of a flat head screw 60. A spring 64 has one end secured to the post 63 by means of a screw 65 and has its other end connected by means of a screw 66 to a follower block 67. A handle 68 formed integral with block 67 extends upwardly through the longitudinal slot 41. The spring 64 urges the follower 67 to the left and since the follower bears against the right end of the row of staples 61 the row is also urged towards the left. A similar post 63a is positioned in the longitudinal slot 59 and a similar spring and follower block cooperate to urge the row of staples 62 to the left.

As may be seen in Figure 8, the sides of the longitudinal slot 58 guide the staples. The riveting plunger generally designated by the numeral 69 includes a substantially heavy rectangular bridge piece 70, and formed integral therewith and extending vertically downwardly are plunger members 71 and 72. Since these plunger members operate through the slots 46 and 47 respectively, they are spaced apart the desired distance between the rivets securing the ends of the belt together. A plate 73 is secured to the end of the carriage by means of screws 74 and it has a flat portion 75 at the end of the longitudinal slot 58 and a second flat portion 76 at the end of the longitudinal slot 59. Plate 73 also has a central offset portion 77 which embraces the tongue portion 45. The end staple in each row is urged against the plate 73 and when in that position, they are in alignment with the plunger portions 71 and 72.

The carriage has vertical pins 78 and 79 mounted therein and lying on the center lines of the slots 43 and 44. The helical spring 80 mounted on the pin 78 and a second helical spring 81 mounted on the pin 79 react against the carriage and against the portion 70 of the plunger, thereby urging it upwardly.

For forcing the plunger member 69 downwardly, we may employ a number of different means and have herein shown two forms of levers for that purpose. One form of lever shown in Figures 6 to 9 is designated generally by the numeral 82 and consists of a metallic strip 83 and a second metallic strip 84. These strips contact each other for a length 85 near the end thereof and lie within a slot 86 formed in the block 54. A cross-pin 87 mounted in the block 54 forms a pivot pin upon which the lever 82 is mounted. The lever also has spaced parallel portions through which a shaft 88 extends. Mounted on the shaft 88 in spaced relation to one another are rollers 89 and 90, and adjacent to the roller 89 is a washer 91 which bears against the shoulder formed on the shaft 88 and prevents movement of the roller 89, endwise. Adjacent to the roller 90 is a second washer 92 which also members up with the shouldered shaft 88 and prevents the roller 90 from moving endwise. The strips 83 and 84 have portions that accommodate an operating handle 93. The operating handle is mounted on a bolt 94 which extends through the ends of the operating lever 82 and is flanked on the ends by washers 95 and 96.

When an operator grasps the handle 93 and moves the same downwardly, the rollers 89 and 90 urge the plunger member 69 downwardly against the opposite urge of the springs 80 and 81, with the result that the end staple in each row is separated from its neighbors and is forced through the work. The work is held in a manner to be presently described and the carriage 28 may be moved relative to the work after the screw 36 is loosened, and when moved to a desired position may be secured to that position by means of the said screw 36. The base 21 is provided with lugs 97 and 98 and these lugs are slotted so that bolts or lag screws may be used to secure the device to a bench or other support.

An alternate form of handle, as shown in Figure 12, wherein the two strips 83a and 84a, where they stand beyond the rollers, are bent back into contact with one another at 83b and 84b to accommodate a handle 99.

An elongated block 100 has an angular face 101 which forms a guide for one engaging edge of the belt and an angular surface 102 formed on the base 21 is adapted to be contacted by the opposite engaging edge of the belt. The base 21 has tongue-shaped portions 103 and 104 which engage corresponding groove portions in the block 100 and thereby form ways. The portion 103 has a longitudinal undercut portion 105 adapted to be engaged by the end of a screw 106 mounted adjacent to one end of the block member 100, and likewise the member 104 has a similar undercut portion 107 adapted to be engaged at the end of a screw 108 carried in the block 100, thereby an operator is enabled to adjust the block 100 in accordance with the size of belt to be processed.

The device may also include a number of V-shaped blocks, one of which is shown at 109. These blocks are adapted to be positioned in the bottom of the space between the surfaces 101 and 102 to accommodate larger or smaller belts. These blocks may be properly located on the base 21 by means of dowels, one of which is shown at 110. Thus, we are able to adjust the device not only to accommodate V-belts to different widths, but also V-belts of different thicknesses.

Each block 109 is provided with a series of lateral grooves 111 in line with the staples and adapted to turn the points of the staples toward each other as the staples are forced through the belt. A graduated scale 112 may be formed on the side of the base 21 adjacent of the surface thereof and an arrow 113 formed on the side of the carriage in cooperative relation with the scale 112 is provided to enable the operator to position the carriage in accordance with the number of staples to be forced through the belt. For example in a verry narrow belt a single staple may be used in each position, whereas in wider belts, two or more staples may be used and may be laterally displaced by moving the carriage on the base.

The lug 97 may have a slot 114 formed therein to accommodate a bolt or lag screw and likewise a lug 98 may be provided with a slot 115 for the same purpose.

Although we have shown in the accompanying drawing one embodiment of the invention, it is obvious that many changes may be made in the arrangement shown without departing from the spirit of the invention, as set forth in the following claims.

What is claimed is:

1. In a device for splicing V belts, a base, means on said base to hold the beveled ends of a V belt in matched relation, said means having angular faces corresponding to the side edges of said belt, a carriage on said base, means in said carriage adapted to receive a plurality of staples, and means on said carriage for forcing at least one of said staples through the matched ends of said belt.

2. In a device for splicing V belts, a base, means on said base to hold the beveled ends of the V belt in matched relation, with the outside of the belt facing upwardly, a carriage on said base, a channel formed in said carriage and adapted to carry a plurality of staples, a second channel formed in said carriage in parallel spaced relation to said first channel and adapted to carry a second plurality of staples, means for urging said staples toward one end of said carriage, and means on said last end of said carriage for forcing the end staples in each of said slots through the matched ends of said belt.

3. In a device for splicing V belts, a base, means on said base adapted to be engaged by the driving surfaces of a V belt to be spliced, said means being adapted to hold said belt with its beveled ends in matched relation, a carriage on said base adapted to be moved to and secured in a plurality of positions thereon, a pair of spaced channels formed in said carriage, said channels to be adapted to carry rows of staples, means in each channel adapted to urge said staples toward one end thereof, plunger means adapted to move in a path crossing said last end of said channels, and lever means carried on said carriage for forcing said plunger means downwardly and thereby forcing the end staple in each of said channels through the matched ends of said belt.

4. In a device for forcing metallic staples through V belts for splicing them, a base, adjustable means on said base for holding the beveled ends of a V belt in matched relation, said means being adapted to be adjusted in accordance with the sizes of the belts to be spliced, a carriage supported on said base and movable along a path at right angles to the longitudinal axis of said means for holding the belt, a pair of spaced channels formed in said carriage, each of said channels being adapted to carry a row of said staples, means in each channel adapted to urge the staples toward one end thereof, said last-mentioned end being means adapted to move in a path crossing said last end of said channels and adapted to engage the end staple in each channel, and lever means carried on said carriage for forcing said plunger means downwardly and thereby driving the engaged staples in said channels through the matched ends of the belt.

5. The invention, according to claim 4, in which said plunger means is comprised of a pair of spaced plungers joined by a heavier bridge portion, and in which said lever means carries rollers adapted to engage said bridge portion and thereby force said plunger means downwardly.

6. The invention, according to claim 4, in which said means for holding the beveled ends of a V belt in matched relation is formed in part of said base and in part of a member movable on ways on said base, said member including screw means adapted to engage said ways for clamping said member in an adjusted position on said carriage.

7. The invention, according to claim 4, in which a visual indicator is formed in part on one edge of said carriage and in part on said base, said latter part being in cooperative relation with said first part.

8. The invention, according to claim 4, in which said adjustable means on the base for holding the beveled ends of the V belt in matched relation comprises a removable block doweled on said base and thereby positively located on said base with respect to the path of said carriage.

9. The invention, according to claim 4, in which said lever means is comprised of a pair of identical members oppositely faced to form therebetween a rectangular opening, and in which a shaft mounted thereon and spanning said opening carries rollers adapted to engage said plunger means when said lever means is moved downwardly.

PERCY W. DOBLIN.
HANDEL ASHWORTH.

REFERENCES CITED

The following references are of record in the file of this patent:

UNITED STATES PATENTS

| Number    | Name   | Date          |
|-----------|--------|---------------|
| 1,517,647 | Lake   | Dec. 2, 1924  |
| 2,268,102 | Attula | Dec. 30, 1941 |